United States Patent
Noske

(10) Patent No.: US 7,680,193 B2
(45) Date of Patent: Mar. 16, 2010

(54) METHOD FOR STORING VIDEO SIGNALS WITH DIFFERENT READ/WRITE RATES

(75) Inventor: Reiner Noske, Darmstadt (DE)

(73) Assignee: Thomson Licensing, Boulogne Billancourt (FR)

( * ) Notice: Subject to any disclaimer, the term of this patent is extended or adjusted under 35 U.S.C. 154(b) by 1644 days.

(21) Appl. No.: 10/501,530

(22) PCT Filed: Dec. 23, 2002

(86) PCT No.: PCT/EP02/14711

§ 371 (c)(1), (2), (4) Date: Jul. 14, 2004

(87) PCT Pub. No.: WO03/058977

PCT Pub. Date: Jul. 17, 2003

(65) Prior Publication Data

US 2005/0044322 A1    Feb. 24, 2005

(30) Foreign Application Priority Data

Jan. 14, 2002    (DE)    .............................. 102 00 990

(51) Int. Cl.
*H04N 7/12*    (2006.01)

(52) U.S. Cl. ................................ 375/240.28

(58) Field of Classification Search ............ 375/240.26, 375/240.28
See application file for complete search history.

(56) References Cited

U.S. PATENT DOCUMENTS 5,434,625  A  *  7/1995  Willis ........................ 348/564
7,034,885  B1 *  4/2006  Koyanagi et al. ........... 348/441

FOREIGN PATENT DOCUMENTS

FR    2578674    9/1986

OTHER PUBLICATIONS

Search Report Dated April 28, 2003.

* cited by examiner

*Primary Examiner*—Y. Lee
*Assistant Examiner*—Richard Torrente
(74) *Attorney, Agent, or Firm*—Robert D. Shedd; Robert B. Levy

(57) ABSTRACT

The invention provides a method for storing video signals at a first rate and reading the stored video signals at a second rate. According to an embodiment of the method, the video signals to be stored are compressed. The compressed video signals are stored in a memory at a first rate. The compressed video signals a read from the memory into a buffer at the first rate. The video signals stored in the buffer are read from the buffer at a second rate such that the video signals are decompressed.

6 Claims, 2 Drawing Sheets

METHOD FOR STORING VIDEO SIGNALS WITH DIFFERENT READ/WRITE RATES

This application claims the benefit, under 35 U.S.C. § 365 of International Application PCT/EP02/14711, filed Dec. 23, 2002, which was published in accordance with PCT Article 21(2) on Jul. 17, 2003 in English and which claims the benefit of German patent application No. 10200990.2, filed Jan. 14, 2002.

TECHNICAL FIELD

The invention relates to a method for storing video signals.

BACKGROUND OF THE INVENTION

Television equipment and systems often require storage of video signals, and reading and writing are to be performed with different clocks. This is the case for example in film scanners and in synchronising devices. Examples of memory modules in which reading can be effected with a different clock from writing include so-called FIFOs (First-In First-Out). The latter have the disadvantage however, that they are available for the large capacity required for the abovementioned purposes only with a considerable outlay. Moreover, the maintenance of the temporal sequence of the signal, that is to say of the pixels, which is provided in the case of FIFOs considerably restricts their use. Although random access memories (RAMs) are more advantageous in this respect, the addressing and changeover between writing and reading operation reduces the speed.

SUMMARY OF THE INVENTION

An embodiment of the invention provides a method for storing video signals at a first rate and reading the stored video signals at a second rate. According to an embodiment of the method, the video signals to be stored are compressed. The compressed video signals are stored in a memory at a first rate. The compressed video signals are read from the memory into a buffer at the first rate. The video signals stored in the buffer are read from the buffer at a second rate such that the video signals are decompressed, with the aid of a random access memory that is operated synchronously during writing and reading, there being connected downstream of the random access memory a further memory with different frequencies for writing and reading, the video signals to be stored are divided into a plurality of parallel data streams. The data streams are time-compressed in such a way that the compressed data streams take up only a part of a predetermined write-read cycle for the random access memory. Data streams read from the random access memory are conducted via the further memory and combined to form video signals.

DETAILED DESCRIPTION OF THE DRAWINGS

Figure 1:
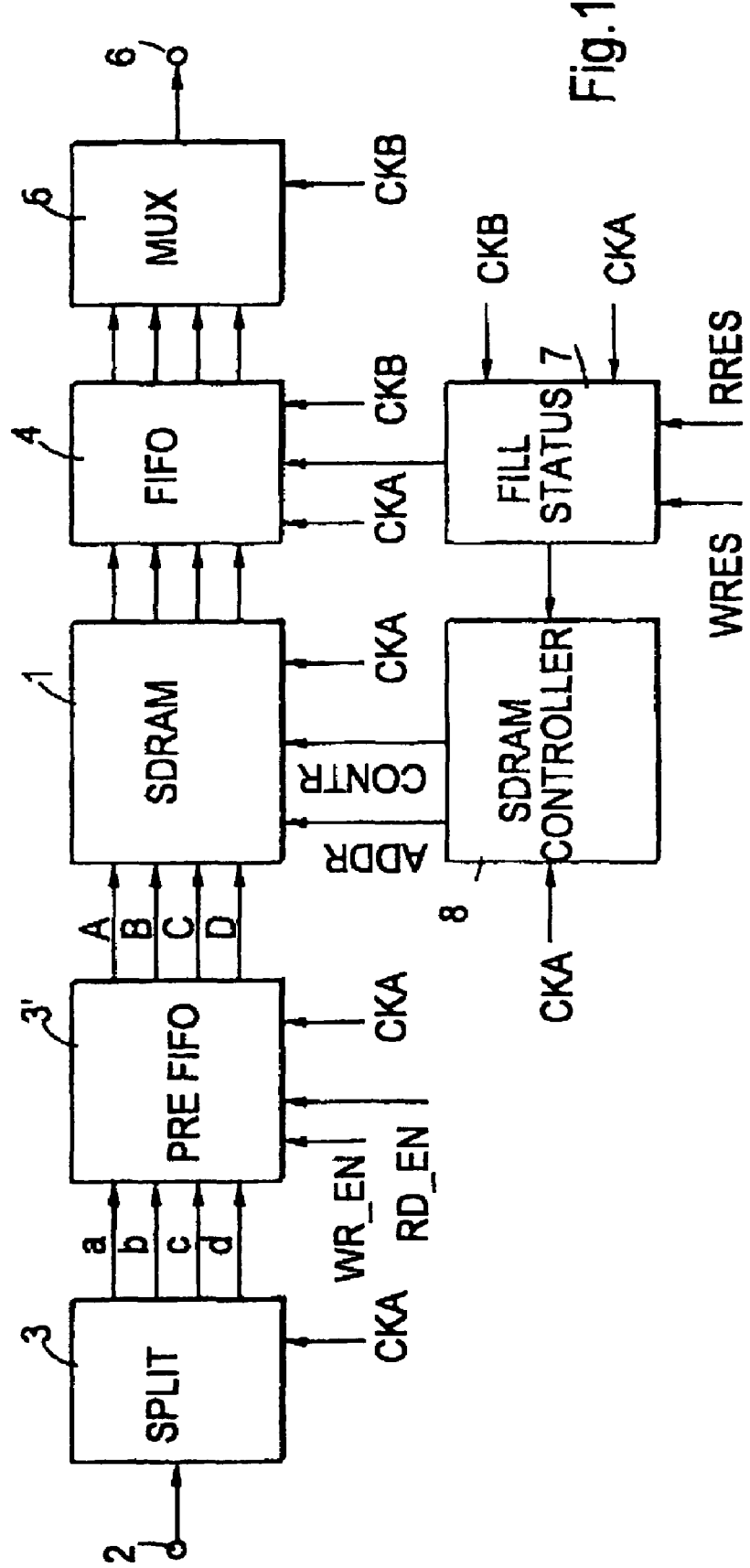
FIG. 1 shows an arrangement for carrying out the method according to the invention, FIG. 2 diagrammatically shows the illustration of the division of the video signals into a plurality of data streams, and FIG. 3 diagrammatically shows write and read operations and also the intervening control of the SDRAM.

A method according to an embodiment of the invention operates such that video signals to be stored are divided into a plurality of parallel data streams. The data streams are time-compressed in such a way that the compressed data streams take up only a part of a predetermined write-read cycle for the memory. In one embodiment of the invention, the memory is a Random Access Memory, for example, an SDRAM. The data streams read from the memory are conducted via a second memory, according to one embodiment, a buffer memory. The data streams are combined, i.e., decompressed, to form video signals. In an embodiment of the invention, the data streams are provided to a multiplexer for re-combining or decompressing.

The method according to the invention enables rapid reading and writing, so that even video signals with very high bit rates can be stored. Moreover, SDRAMs with large capacities can be obtained at low cost. In the case of the method according to the invention, the rapid writing and reading is made possible in particular by virtue of the fact that not every memory location need be addressed individually, rather only one bank address is used for a data block comprising 512 pixels, for example, which are read again in the same sequence. Nevertheless, the method according to the invention is extremely flexible and enables the video signals to be read in a manner largely independent of the clock and the structure (number of pixels, number of lines, interline or progressive) of the video signals supplied.

In order to enable reading of the video signals faster than writing, the method according to the invention may provide for the write-read cycle to comprise a write period and at least one read period. In this case, it has proved to be advantageous if the write-read cycle comprises a write period and three read periods.

An advantageous refinement of the method according to the invention consists in the fact that the write or read periods in each case contain, prior to the writing or reading, respectively, control time segments for setting the random access memory for writing or reading, respectively, and, after the write or read periods, respectively, control time segments for terminating the writing or reading, respectively. In said time segments, all the commands required for the subsequent writing or reading are fed to the random access memories.

In this case, it may furthermore be provided that the random access memory is furthermore refreshed in the time segments. This refinement can be developed such that in the control time segments preceding the writing or reading, the following code sequence is fed to the random access memory: NOPs (No Operations), PALL (Precharge All Banks), NOPs, REF (Auto-Refresh Command), ACTV (Bank Active (RAS), ACTV, NOPs.

By virtue of the fact that the control time segments contain defined Signals—in contrast to the continuously changing video data—the signals in the control time segments can readily be utilised for the synchronisation of digital measurement and test devices.

In a method embodied in practice, it was furthermore provided that in the control time segments after writing or reading, the following code sequence is fed to the random access memory: BST (Burst Stop), PALL, REF, NOPs.

Details of these code sequences depend on the respective embodiments of the SDRAMs.

The division of the video signals (demultiplex) may be chosen differently depending on requirements made of speed, made of quantity of video data to be stored, and depending on the SDRAM used. In a method carried out in practice, it has proved expedient for the video signals to be divided pixel by pixel.

Digital video signals are fed to the arrangement according to FIG. 1 via an input 2, which signals are divided into four parallel data streams a, b, c, d in a circuit 3, which data streams are delayed relative to one another in each case by the duration of a pixel. In a buffer memory 3'—designated as PRE-FIFO in FIG. 1—every fourth pixel is taken from the data streams a, b, c, d, thereby producing compressed data streams A, B, C, D. To that end, the circuit 3 and the buffer memory 3' are clocked with a clock CKA (also called Masterclock). The buffer memory 3' receives suitable control signals WR_EN and RD_EN, which bring about the writing of every fourth pixel and the reading of each stored pixel.

Figure 2:
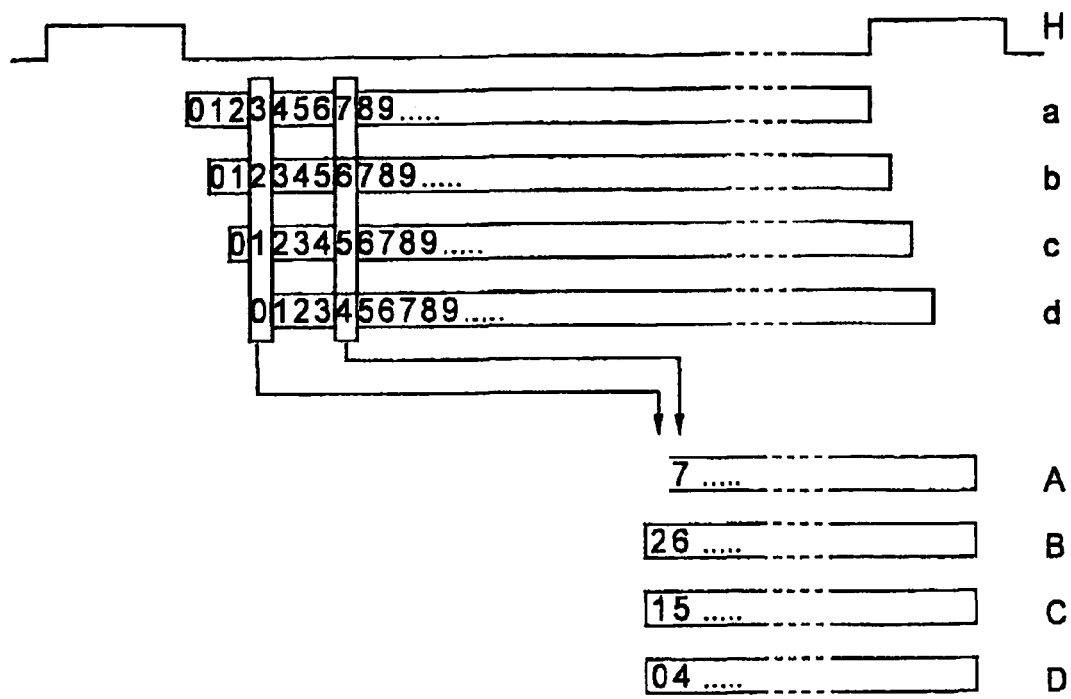

This operation is illustrated diagrammatically in FIG. 2, the duration of a television line being indicated in line H using blanking pulses. Owing to the large ratio of the line period to the duration of a pixel, all of the signals and data streams are shown interrupted in FIG. 2.

The lines a to d show the data streams which are in each case delayed by the duration of a pixel and are designated identically in FIG. 1. In this case, the pixels are numbered consecutively starting from 0. In this form, the data streams a to d are fed to the buffer memory 3' (FIG. 1). Every fourth pixel respectively contained in the data stream a to d is written and read with the clock CKA—that is to say, in FIG. 2, pixels 3 and 7 from data stream a, pixels 2 and 6 from data stream b, etc. As a result, the data streams A, B, C and D are produced with the same "pixel clock" CKA. Since they each contain only every fourth pixel, they are correspondingly time-compressed with respect to the data streams a to d.

A respective colour component of a pixel is reproduced by means of a data word having a width of ten bits. However, other bit widths are also possible. For greater clarity in the illustration, the processing of a plurality of colour components is not discussed in detail in the exemplary embodiment. It is to be assumed that a plurality of data streams, for example for R, G and B or Y, CR and CB, are correspondingly processed in parallel. Equally, in the case of supplied video signals which form the basis for a progressive scanning and are later used as video signals with interline, it is possible to provide separate memories or memory areas for the even-numbered and odd-numbered lines.

The data streams indicated in lines A to D in FIG. 2 are then written to the random access memory 1 and are buffer-stored there according to the invention. The SDRAM 1 receives addresses ADDR and control data CONTR from an SDRAM controller 8. Moreover, the SDRAM 1 and the SDRAM controller 8 receive the clock CKA. This clock serves for writing and reading in the SDRAM 1.

Connected to the SDRAM 1 is a FIFO memory 4, to which the data streams read from the SDRAM are written with the clock CKA. A clock CKB serves for reading from the FIFO memory 4. The said clock is part of the studio standard and is not synchronous with the clock CKA. The clocks CKA and CKB and also reset signals WRES and PRES are fed to a further control device 7. The occupancy of the FIFO memory 4 is determined from the two clocks CKA and CKB. If the FIFO memory 4 threatens to overflow or become empty, corresponding items of information are passed to the SDRAM controller 8 which fills the FIFO memory 4 by reading further data or initially prevents the reading of further data.

Figure 3:
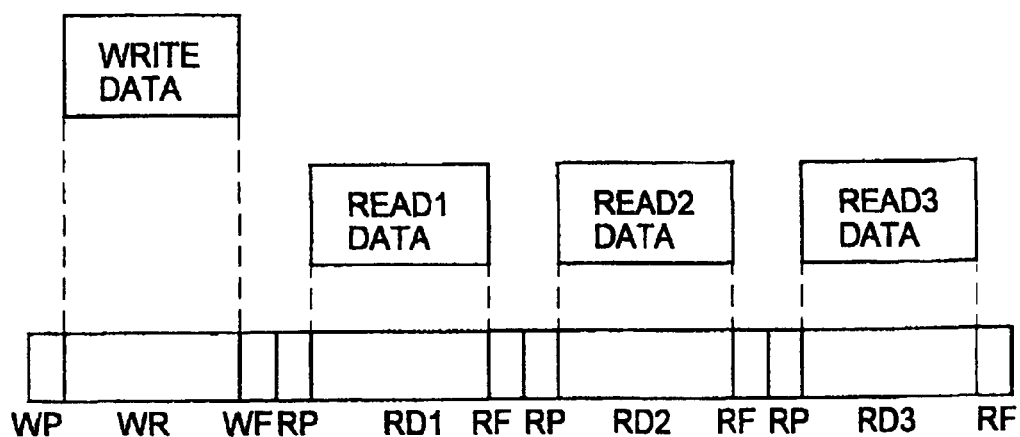

An entire write-read cycle illustrated in FIG. 3 contains a write period WR and read periods READ1 to READ3. Each of these write and read periods is assigned a time segment WP and RP, respectively, for preparing for the writing and reading, respectively, and a time segment WF and RF, respectively, for terminating the writing and reading, respectively. The memory content of the SDRAM is also refreshed during these time segments.

In the SDRAM controller 8, command sequences are programmed for the write and read preparation WP and RP, respectively, and also for the termination WF and RF of the respective operation, which command sequences are adapted to the use of the respective SDRAM module. In a practical embodiment of the invention using an SDRAM of the MB81F64842C-102 type from Toshiba, the following commands were chosen:
WP: NOPs, PALL, NOPs, REF, ACTV, ACTV, NOPS,
WR: WRIT, (NOPs),
WF: BST, PALL, REF, NOPs,
RP: NOPs, PALL, NOPS, REF, ACTV, ACTV, NOPs,
RD: READ, (NOPs),
RF: BST, PALL, REF, NOPs.

The invention claimed is:

1. Method for storing video signals at a first rate and reading the stored video signals at a second rate; comprising the steps of:
compressing video signals in a first buffer memory;
storing the compressed video signals from said first buffer memory in a random access memory; operated synchronously during writing and reading;
reading said compressed video signals from said random access memory into a second buffer memory at said first rate;
reading said compressed video signals from said second buffer at said second rate such that said compressed video signals are decompressed,
wherein the step of compressing video signals includes:
dividing video signals to be stored each into a plural number N of parallel data streams each carrying said video signals, whereby said dividing comprises delaying said parallel data streams with respect to each other by one pixel period; and
time-compressing said plural number of parallel data streams to form a respective plural number of parallel time-compressed data streams,
whereby each of said time-compressed data streams is obtained by sampling every N-th pixel from the respective parallel data stream, said sampling being carried out simultaneously for said parallel data streams at said first rate;
wherein the step of storing said compressed video signals from said first buffer memory in said random access memory includes:
writing said time-compressed data streams to said random access memory during a write portion of a predetermined write-read cycle of said random access memory;
whereby each of said time-compressed data streams takes up only a part of said predetermined write-read cycle;
wherein the step of reading said compressed video signals from said random access memory into said second buffer memory at said first rate includes:
reading out said time-compressed data streams from said random access memory in a read portion of said write-read cycle and feeding them to said second buffer memory;
and wherein the step of reading said compressed video signals from said second buffer memory at said second rate includes:
multiplexing said decompressed data streams.

2. The method according to claim 1, wherein the write-read cycle of said random access memory a write period and at least one read period.

3. The method according to claim 2, wherein the write-read cycle of said random access memory comprises a write period and three read periods.

4. The method according to claim 2, wherein the write or read periods in each case contain, prior to the writing or reading, respectively, control time segments for setting said random access memory for writing or reading, respectively, and, after the write or read periods, respectively, control time segments for terminating the writing or reading, respectively.

5. The method according to claim 4, wherein said random access memory is furthermore refreshed in said time segments.

6. The method according to claim 1, wherein the video signals are divided pixel by pixel.

* * * * *